United States Patent

[11] 3,607,876

[72] Inventor Denis M. Bailey
East Greenbush, N.Y.
[21] Appl. No. 779,649
[22] Filed Nov. 27, 1968
[45] Patented Sept. 21, 1971
[73] Assignee Sterling Drug Inc.
New York, N.Y.

[54] 3-[4-(SUBSTITUTED-OXY)-PHENYL]-2-SUBSTITUTED-PHTHALIMIDINES
18 Claims, No Drawings
[52] U.S. Cl............................................. 260/294 AC,
260/247.2 A, 260/268 BC, 260/326.1,
424/248, 424/250, 424/267, 424/274
[51] Int. Cl.................................................. C07d 27/52
[50] Field of Search........................................ 260/294
AC, 326.1, 247.2 A, 268 BL

[56] References Cited
UNITED STATES PATENTS
3,296,276 1/1967 Sherlock........................ 260/325

FOREIGN PATENTS
1,135,461 3/1963 Germany

OTHER REFERENCES
Shirley, " Organic Chemistry," Holt, Rinehart and Winston, New York (1964) pp. 266–267.

Primary Examiner—Henry R. Jiles
Assistant Examiner—G. Thomas Todd
Attorneys—Elmer J. Lawson, B. Woodrow Wyatt, Thomas L. Johnson, Robert K. Bair, R. Clifford Bourgeois, William G. Webb and Roger T. Wolfe ABSTRACT: 3-(4-R-O-Phenyl)-2-Z-phthalimidines, having endocrinological activities, are prepared by reacting a 3-(4-hydroxyphenyl)phthalide with an amine of the formula Z-NH$_2$ and reacting the resulting 3-(4-hydroxyphenyl)-2-Z-phthalimidine with an R-halide where R is lower-alkyl, lower-carbalkoxy-(lower-alkyl), 2,3-epoxypropyl or BN-Y where BN is lower-tertiary-amino and Y is polycarbon-lower-alkylene, and Z is alkyl having from four to 10 carbon atoms, cycloalkyl having from three to eight ring-carbon atoms inclusive, phenyl and Q-phenyl where Q is from one to three substituents selected from halo, lower-alkyl, lower-alkoxy, trihalomethyl, hydroxy or benzyloxy.

3-[4-(SUBSTITUTED-OXY)-PHENYL]-2-SUBSTITUTED-PHTHALIMIDINES

This invention relates to compositions of matter known in the art of chemistry as phthalimidines and to their preparation.

The invention sought to be patented, in its composition aspect, resides in the compounds which I designate as phthalimidines substituted at the 3-position by 4-R-O-phenyl where R is lower-alkyl, lower-carbalkoxy (lower-alkyl), 2,3-epoxypropyl or BN-Y where BN is lower-tertiary-amino and Y is polycarbon-lower-alkylene, and at the 2-position by alkyl having from four to 10 carbon atoms, cycloalkyl having from three to eight ring-carbon atoms inclusive, phenyl and Q-phenyl where Q is from one to three substituents selected from halo, lower-alkyl, lower-alkoxy, trihalomethyl, hydroxy or benzyloxy. Embodiments of the invention, when tested according to standard endocrinological evaluation procedures in animals, have been found to possess the inherent applied use characteristics of having antifertility activity in female rats and in having hypocholesteremic activity in male rats, thereby indicating their usefulness as antifertility and hypocholesteremic agents, respectively.

The invention sought to be patented, in its process aspect, resides in the process of preparing said 3-(4-RO-phenyl)-2-Z-phthalimidines which comprises the steps of reacting a 3-(4-hydroxyphenyl)phthalide with an amine of the formula Z-NH$_2$ and reacting the resulting 3-(4-hydroxyphenyl) 2-Z-phthalimidine with an ester of the formula, R-An, where R and Z have the meanings given hereinabove, and An is an anion of a strong inorganic acid or an organic sulfonic acid.

Without limiting the generality of the foregoing, illustrative and preferred embodiments of the 3-(4-RO-phenyl)-2-Z-phthalimidines of the invention are the compounds of formula I

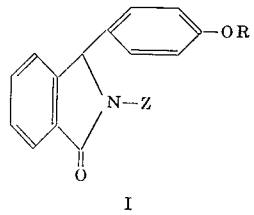

I where R is lower-alkyl, lower-carbalkoxy-(lower-alkoxy), 2,3-epoxypropyl or Y-NB where Y is polycarbon-lower-alkylene, and NB is lower-tertiary-amino, and Z is alkyl having from four to 10 carbon atoms, cycloalkyl having from three to eight ring-carbon atoms inclusive, phenyl and Q-phenyl where Q is from one to three substituents selected from halo, lower-alkyl, lower-alkoxy, trihalomethyl, hydroxy or benzyloxy.

Particularly preferred embodiments of the 3-(4-RO-phenyl)-2-Z-phthalimidines of the invention are the compounds of formula I where R is 2-di-(lower-alkyl)-amino-ethyl and Z is phenyl, 4-methoxyphenyl or cyclohexyl, where R is 2-pyrrolidinoethyl or 2-piperidinoethyl and Z is cycloalkyl having from six to eight ring-carbon atoms inclusive, and where R is pyrrolidino-(polycarbon-lower-alkyl) and Z is phenyl.

"Lower-alkyl," as used herein, is an alkyl radical, preferably having from one to six carbon atoms, which can be arranged as straight or branched chains including, for instance, but without limiting the generality of the foregoing, methyl, ethyl, n-propyl, isopropyl, 2-butyl, iso-butyl and n-hexyl.

"Lower-alkoxy," as used herein is an alkoxy radical, preferably having from one to six carbon atoms, which can be arranged as straight or branched chains including, for instance but without limiting the generality of the foregoing, methoxy, ethoxy, n-proproxy, isopropoxy, n-butoxy, 2-butoxy, isobutoxy, n-hexoxy, and the like.

"Lower-carbalkoxy," can be designated structurally as -COO-(lower-alkyl). Thus, "lower-carbalkoxy-(lower-alkyl)," as used herein, is illustrated by carbethoxymethyl, carbomethoxymethyl, carbo-n-butoxymethyl, carbo-n-hexoxymethyl, 2-(carbethoxy)ethyl, 3-(carbomethoxy)propyl, 1-(carbo-methoxy)ethyl, 4-(carbethoxy)butyl, 6-(carbisopropoxy)hexyl, and the like.

"Lower-tertiary-amino," as used herein, preferably is di-(lower-alkyl)amino or saturated-N-heteromonocyclic 5- to 7-membered rings consisting of piperidino, morpholino, pyrrolidino, piperazino, hexamethyleneimino, or lower-alkylated (preferably one to three lower-alkyl groups) derivatives thereof, among which are, for purposes of illustration, dimethylamino, diethylamino, ethylmethylamino, di-n-butylamino di-n-hexylamino, piperidino, 2-methylpiperidino, 3-ethylpiperidino 2,6-di-methylpiperidino, morpholino, 2-methylmorpholino, pyrrolidino, 2-methylpyrrolidino, 2,5-dimethylpyrrolidino, piperazino, 4-methylpiperazino, 2,4,6-trimethylpiperazino, 2-methylhexamethyleneimino, 2,7-dimethylhexamethyleneimino, and the like.

"Polycarbon-lower-alkylene," as used herein, is an alkylene radical having from two to six carbon atoms and having its connecting linkages on different carbon atoms, including the straight and branched-chain radicals, among which are, for purposes of illustration but without limiting the generality of the foregoing,

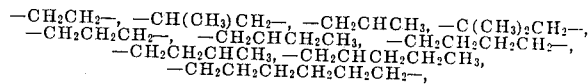

and the like.

The 3-[4-(BN-Y-O)-phenyl]-2-Z-phthalimidines of the invention, e.g., as illustrated by the compounds of the formula I where R is NB, are useful in the free base form or in the form of their acid-addition salts, and both forms are within the purview of the invention, and are considered to be one and the same invention. The acid-addition salts are simply a more convenient form for use; and, in practice, use of the salt form inherently amounts to use of the base form. The acids which can be used to prepare the acid-addition salts are preferably those which produce, when combined with the free base, pharmaceutically acceptable salts, that is, salts whose anions are relatively innocuous to the animal organism in pharmaceutical doses of the salts, so that the beneficial properties inherent in the free base are not vitiated by side effects ascribable to the anions; in other word, the latter do not substantially affect the pharmaceutical properties inherent in the cations. Appropriate pharmaceutically acceptable salts within the scope of the invention are preferably those derived from mineral acids such as hydrochloric acid, hydrobromic acid, hydriodic acid, nitric acid, phosphoric acid, sulfamic acid, and sulfuric acid; and organic sulfonic acids such as methanesulfonic acid, ethanesulfonic acid, benzenesulfonic acid, P-toluenesulfonic acid, naponic acid (1,4-naphthalenedisulfonic acid), and the like giving the hydrochloride, hydrobromide, hydriodide, nitrate, phosphate, sulfamate, sulfate, methanesulfonate, ethanesulfonate, benzenesulfonate, P-toluenesulfonate and naponate, respectively.

The acid-addition salts are prepared preferably by reacting the free base and acid in an organic solvent, e.g., ethanol, 2-propanol, acetone, etc., in which case the salt separates directly or can be obtained by concentration of the solution.

The nature of the starting materials, mode of syntheses, results of elementary analyses, examination of the final products by infrared and nuclear magnetic resonance spectrographic analyses, all taken together, confirm the molecular structure assigned to these compounds.

The manner and process of making and using the invention will now be generally described so as to enable a person skilled in the art of chemistry to make and use the same, as follows:

The first step of the process of the invention is carried out by reacting a 3-(4-hydroxyphenyl)phthalide with an amine of the formula, Z–NH$_2$. This step is carried out preferably by heating said reactants either in the absence or the presence of a suitable solvent, e.g. an eutectic mixture of diphenyl and diphenyl ether (Dowtherm®A), mineral oil, at about 100 to 200° C., preferably about 150-180° C.; also, an excess of the amine, Z-NH$_2$, can be used as the solvent. The intermediate phthalides and amines, as well as the esters of the formula, R-An, used in the next step, are known compounds, either available commercially or readily prepared by known methods.

The second step of the process is carried out preferably by heating the 3-(4-hydroxphenyl)-2-Z-phthalimidine obtained by the above first step with an ester of the formula, R-An, where R has the meaning given above for formula I and An is the anion of a strong inorganic acid or an organic sulfonic acid, e.g., chloride, bromide, iodide, sulfate, methanesulfonate, benzenesulfonate and P-toluenesulfonate This O-alkylation step is preferably run in the presence of an acid-acceptor using the chloride, bromide or iodide because of the ready availability of the requisite lower-alkyl halides. The acid-acceptor is a basic substance which preferably forms freely water-soluble byproducts easily separable from the product of the reaction, including for example, sodium hydroxide, potassium hydroxide, sodium carbonate, potassium carbonate, potassium bicarbonate, sodium alkoxides, potassium alkoxides, sodium amide, and the like. The purpose of the acid-acceptor is to take up the hydrogen halide (or HAn) which is split out during the course of the reaction. The reaction can be carried out in either the presence or absence of a suitable solvent, but preferably in a solvent such as a lower-alkanol, acetone, dioxane, dimethylformamide, dimethyl sulfoxide, benzene, diethylene glycol dimethyl ether, or a mixture of such solvents. The reaction is generally carried out at a temperature between about room temperature (about 25° C.) and 150° C., preferably heating on a steam bath in a stirred mixture a dimethylformamide and anhydrous potassium carbonate.

The compounds of formula I where Z is hydroxyphenyl are preferably prepared by catalytic hydrogenating the corresponding compounds where Z is benzyloxyphenyl using, e.g., platinum oxide.

The best mode contemplated for carrying out the invention will now be set forth as follows:

A. 3-(4-HYDROXYPHENYL)-2-(Q-PHENYL)PHTHALIMIDINES 1. 3-(4-Hydroxphenyl)-2-(4-methyoxphenyl)-phthalimidine—A mixture containing 100 g. of 3-(4-hydroxyphenyl)-phthalide and 140 g. of 4-methoxyaniline was heated at about 170° C. under nitrogen for 5 hours allowing the water formed by the reaction to distill off. The reaction mixture was cooled to about 90° C. and 250 ml. of toluene was added. The mixture was allowed to cool to room temperature and the separated product was collected, washed with toluene and dried in in vacuo at 50° C. to yield 128 g. of 3-(4-hydroxyphenyl)-2-(4-methoxyphenyl)phthalimidine, m.p. 235-242° C. This unpurified product was used as an intermediate in O-alkylation reaction described hereinbelow, e.g., Example B-1. A 10 g. sample of the product was recrystallized from 150 ml. of acetic acid, dried at 60° C. in vacuo to yield 8.3 g. of the purified 3-(4-hydroxyphenyl)-2-(4-methoxyphenyl)phthalimidine, m.p. 255-260° C.

2. 3-(4-Hydroxphenyl)-2-(3-trifluoromethylphenyl)-phthalimidine, 78.8 g. of unpurified product melting at 220-227 C. and 16.0 g. (from 20 g.) of recrystallized product m.p. 228-231° C., was prepared as in example I using 56.5 g. of 3-(4-hydroxyphenyl)phthalide, 100 ml. of 3-trifluoromethyl-aniline, a heating period of 5 hours at 160-165 C. and 250 ml. of toluene.

3. 2-(4-Chlorophenyl)-3-(4-hydroxyphenyl)-phthalimidine—A stirred mixture containing 56.5 g. of 3-(4-hydroxyphenyl)phthalide, 60 g. of 4-chloroaniline and 50 ml. of Dowtherm A (eutectic mixture of diphenyl and diphenyl ether) was heated at about 170-175° C. for 6½ hours while bubbling nitrogen over the reaction mixture and removing the water formed by the reaction as a distillate. The reaction mixture was cooled, diluted with toluene at 130° C., cooled further to about 50° C. and the separated product collected. The product was washed successively with toluene and n-hexane, and dried in vacuo at 50° C. to yield 74.3 g. of 2-(4-chlorophenyl)-3-(4-hydroxyphenyl)phthalimidine, m.p. 245-255° C.; this unpurified product was used as an intermediate in the O-alkylation reaction described hereinbelow, e.g., Example B-44. A 20 g. portion of the product was recrystallized from 400 ml. of glacial acetic acid, washed successively with acetic acid, toluene and n-hexane, pulverized and dried in in vacuo at 60° C. to yield 15.5 g. of 2-(4-chlorophenyl)-3-(4-hydroxyphenyl)phthalimidine, m.p. 253-257 C.

4. 3-(4-Hydroxy-3-methoxyphenyl)-2-phenylphthalimidine—A mixture containing 20 g. of 3-(4-hydroxy-3-methoxyphenyl)-phthalide and 25 ml. of aniline was heated at about 170-175° C. for about 6 hours under nitrogen as in example 1. The reaction mixture was cooled to about 50° C. and diluted with toluene and n-heptane. When no solid separated the solution was evaporated in vacuo at 100° C. to yield a residue containing a mixture of a solid and an oil. The mixture was triturated with benzene and the solid collected to yield 12.5 g. of 3-(4-hydroxy-3-methoxyphenyl)-2-phenylphthalimidine, m.p. 210-224° C. The filtrate was washed three times with 3N hydrochloric acid and once with sodium bicarbonate solution, dried over anhydrous sodium sulfate and evaporated in vacuo to yield a dark oil consisting primarily of the starting material. The oil was combined with another 50 ml. portion of aniline and refluxed under nitrogen for about 20 hours, removing the water that formed. The reaction mixture was then cooled and diluted with about 200 ml. of toluene, the separated product was collected, combined with the above 12.5 g. portion of the product and recrystallized from glacial acetic acid, washed with benzene and dried in vacuo to yield 37.2 g. of 3-(4-hydroxy-3-methoxyphenyl)-2-phenylphthalimidine, m.p. 216-224° C.

5. 2-(4-Ethoxyphenyl)-3-(4-hydroxyphenyl)phthalimidine, m.p. 251-254° C., 25.8 g., was prepared as in example 1 using 20 g. of 3-(4-hydroxyphenyl)phthalide, 70 ml. of 4-ethoxy-aniline, a heating period of 6 hours and recrystallization from 225 ml. of glacial acetic acid.

6. 2-(4-Benzyloxyphenyl)-3-(4-hydroxyphenyl)-phthalimidine, m.p. 277-283° C., 43.9 g., was prepared as in example 3 using 72 g. of 3-(4-hydroxyphenyl)phthalide, 75 g. of 4-benzyloxyaniline, 100 ml. of Dowtherm A, a heating period of 6 hours at 170-175° C. and recrystallization from glacial acetic acid.

7. 2-(3-Chlorophenyl)-3-(4-hydroxyphenyl)phthalimidine, m.p. 231° C., 80.8 g., was prepared as in Example 1 using 73 g. of 3-(4-hydroxyphenyl)phthalide, 105 ml. of 3-chloroaniline, a heating period of 160-170° C. for five hours and purification by slurring the product with boiling methanol and collecting the product from the hot methanol mixture.

8. 3-(4-Hydroxyphenyl)-2-(4-methylphenyl)phthalimidine, m.p. 273° C., 81.4 g., was prepared as in Example 1 using 73 g. of 3-(4-hydroxyphenyl)phthalide, 170 ml. of 4-methylaniline, a heating period of 6 hours at 165° C. and recrystallization from dimethylformamide-water.

9. 2-Cyclohexyl-3-(4-hydroxyphenyl)phthalimidine—A mixture containing 29.7 g. of 3-(4-hydroxyphenyl)phthalide and 100 ml. of cyclohexylamine was stirred under reflux for fifteen hours, diluted with about 150 ml. of toluene and the mixture cooled to room temperature. The precipitated product was collected, washed with toluene, dried in vacuo at 60 ° C., recrystallized from toluene, dried in vacuo at 60 ° C. to yield 32.0 g. of 2-cyclohexyl-3-(4-hydroxyphenyl)phthalimidine, m.p. 302-311° C.

10. 2-Cycloheptyl-3-(4-hydroxyphenyl)phthalimidine—A mixture containing 56.5 g. of 3-(4-hydroxyphenyl)phthalide, 56.5 g. of cycloheptylamine and 150 ml. of Dowtherm A was heated under nitrogen for 5 hours at 135-140 C., cooled to about 110° C., treated with 75 ml. of n- heptane and the mixture cooled briefly in an ice bath. The resulting precipitate was collected, slurried with hot methanol, slurried several times with boiling n-hexane, recrystallized successively from dimethylformamide-water and acetic acid and dried for 8 hours at 70° C. and 0.1 mm. to yield 12.7 g. of 2-cycloheptyl-3-(hydroxyphenyl)phthalimidine, m.p. 299° C.

11. 2-Cyclooctyl-3-(4-hydroxyphenyl)phthalimidine, m.p. 281° C., 13.2 g., was prepared as in Example A-10 using 67.8 g. of 3-(4-hydroxyphenyl)phthalide, 76 g. of cyclooctylamine, 175 ml. of Dowtherm A, a heating period of 4 and one half hours at 180° C., successive recrystallizations from dimethylformamide-water and acetic acid, and drying the ground product at 70° C. for eight hours at 0.1 mm.

12. 2-n-Hexyl-3-(4-hydroxyphenyl)phthalimidine—A mixture containing 22.6 g. of 3-(4-hydroxyphenyl)phthalide, 50 ml. of n-hexylamine and 300 ml. of xylene was refluxed with stirring with a continuous water separator connected to the reaction vessel. The mixture was refluxed for 21 hours and about 2.5 ml. of water was collected. The reaction mixture was cooled in an ice bath. The resulting precipitate was collected, washed with 3:2 (v/v) of toluene:n-hexane and dried in vacuo at 50° C. to yield 29.4 g. of 2-n-hexyl-3-(4-hydroxyphenyl)phthalimidine, m.p. 199–202° C.

13. 3-(4Hydroxyphenyl)-2-n-octylphthalimidine, m.p. 169–170 C., 28.1 g., was prepared as in Example A-12 using 22.6 g. of 3-(4-hydroxyphenyl)phthalide, 25.8 g. of n-octylamine and 200 ml. of xylene.

14. 2-n-Butyl-3-(4hydroxyphenyl)phthalimidine—To a refluxing solution containing 45.2 g. of 3-(4hydroxyphenyl)phthalide in 500 ml. of xylene and having a continuous separator connected to the reaction vessel was added drop wise with stirring over a period of 4 hours 50 ml. of n-butylamine and the reaction mixture was refluxed for an additional 4 hours when 5 ml. of water had been collected. The reaction mixture was allowed to cool while scratching the walls of the reaction vessel with a glass rod. The separated solid was collected, recrystallized from isopropyl alcohol and dried in vacuo at 50° C. to yield 29.5 g. of 2-n-butyl-3-(4-hydroxyphenyl)phthalimidine, m.p. 198–202° C.

Following the procedure described in the above examples, e.g., A-1, A-9, A-12, using -3-(4-hydroxyphenyl)-phthalide and the appropriate amine of the formula $Z-NH_2$, the following compounds are prepared;

15. 2-(4-Ethylphenyl)-3-(4-hydroxyphenyl)phthalimidine using -hydroxyphenyl)-phthalimidine 4-ethylaniline.
16. 2-(4-n-Butoxyphenyl)-3-(4-hydroxyphenyl)-phthalimidine using 4-n-butoxyaniline.
17. 2-(4-Bromophenyl)-3-(4-hydroxyphenyl)phthalimidine using 4-bromoaniline.
18. 3-(4-Hydroxyphenyl)-2-(4-iodophenyl)phthalimidine using 4-iodoaniline.
19. 2-(2-Fluorophenyl)-3-(4-hydroxyphenyl)-phthalimidine using 2-fluoroaniline.
20. 2-(3,4-Dichlorophenyl)-3-(4-hydroxyphenyl)-phthalimidine using 3,4-dichloroaniline.
21. 3-(4-Hydroxyphenyl)-2-(3,4,5-trimethoxyphenyl)-phthalimidine using (3,4,5-trimethoxyaniline.
22. 2-(3-Benzyloxyphenyl)-3-(4-hydroxyphenyl)-phthalimidine using 3-benzyloxyaniline.
23. 2-Cyclopropyl-3-(4-hydroxyphenyl)phthalimidine using cyclopropylamine.
24. 2-Cyclobutyl-3-(4-hydroxyphenyl)phthalimidine using cyclobutylamine.
25. 2-Cyclopentyl-3-(4-hydroxyphenyl)phthalimidine using cyclopentylamine.
26. 2-n-Hexyl-3-(4-hydroxyphenyl)phthalimidine using n-hexylamine.
27. 3-(4-Hydroxyphenyl)-2-isobutylphthalimidine using isobutylamine.
28. 2-n-Decyl-3-(4-hydroxyphenyl)phthalimidine using n-decylamine.
29. 3-(4-Hydroxyphenyl)-2-(3-trichloromethylphenyl)phthalimidine using 3-trichloromethylaniline.

B. 3-(4-RO-PHENYL)-2-(Q-PHENYL)PHTHALIMIDINES 1. 2-(4-Methoxyphenyl)-3-(4-n-propoxyphenyl)phthalimidine—A mixture containing 16.6 g. of 3-(4-hydroxyphenyl)-2-(4-methoxyphenyl)phthalimidine, 8.1 g. (6.0 ml.) of n-propyl bromide, 25 g. of anhydrous potassium carbonate and 100 ml. of dimethylformamide was stirred on a steam bath for fourteen hours, cooled slightly and filtered. The filtrate was evaporated in vacuo and the residue was taken up in chloroform and water. The chloroform layer was separated and evaporated in vacuo to remove the chloroform. The residue was crystallized from isopropyl alcohol and dried in vacuo at 50° C. to yield 14.7 g. of 2-(4-methoxypheny)-3-(4-n-propoxyphenyl)phthalimidine, m.p. 115.5–117.5° C.

2. 3-[4-(2-Diethylaminoethoxy)phenyl]-2-phenylphthalimidine—A 1.4 g. portion of sodium was dissolved in 200 ml. of absolute ethanol and to the solution was added 15.0 g. of 3-(4-hydroxyphenyl)-2-phenylphthalimidine. After a few minutes, the reaction mixture became homogeneous and to it was added 8 ml. of 2-diethylaminoethyl chloride. The resulting reaction mixture was refluxed for 3 hours and evaporated in vacuo to remove the ethanol and excess 2-diethylaminoethyl chloride. The residue was shaken well with water and chloroform. The chloroform layer was separated and evaporated in vacuo to yield a white solid. The solid was recrystallized twice from isopropyl alcohol to yield 4.2 g. of 3-[4-(2-diethylaminoethoxy)phenyl]-2-phenylphthalimidine, m.p. 107.5–109° C.

3. 2,3-Bis(4-methoxyphenyl)phthalimidine, m.p. 129–131° C., 23.4 g., was prepared as in Example B-1 using 28.2 g. of 3-(4-hydroxyphenyl)-2-(4methoxylphenyl)phthalimidine 25 ml. of methyl iodide 50 g. of anhydrous potassium carbonate and 200 ml. of dimethylformamide.

4. 3-(4-Methoxyphenyl)-2-(4-methylphenyl)phthalimidine, m.p. 129.5° C., 24.1 g., was prepared as in Example B-1 using 25.2 g. of 3-(4-hydroxyphenyl)-2-(4-methylphenyl)phthalimidine, 10 ml. of methyl iodide, 19.4 g. of anhydrous potassium carbonate and 200 ml. of dimethylformamide.

5. 2-(3-Chlorophenyl)-3-(4-methoxyphenyl)phthalimidine, m.p. 136° C., 8.0 g., was prepared as in Example B-1 using 20.1 g. of 2-(3-chlorophenyl)-3-(4-hydroxyphenyl)-phthalimidine, 21 ml. of dimethyl sulfate, 50 g. of anhydrous potassium carbonate, 200 ml. of dimethylformamide, a heating period of 4 and one-half hours and recrystallization from absolute ethanol.

6. 3-]4-(2-Dimethylaminoethoxy)phenyl]-2-phenylphthalimidine—A mixture containing 30.1 g. of 3-(4-hydroxyphenyl)-2-phenylphthalimidine, 15.9 g. 2-dimethyl-aminoethyl chloride hydrochloride, 100 g. of anhydrous potassium carbonate and 300 ml. of dimethylformamide was heated at 90–95° C. for 18 hours. The cooled reaction mixture was filtered and the filtrate was heated in vacuo to remove the dimethylformamide. The residue was treated with ice water and chloroform and shaken well. The layers were separated and the aqueous layers was extracted twice with chloroform. The combined chloroform layer and extracts were dried over anhydrous magnesium sulfate and evaporated in vacuo to remove the chloroform. The residue was recrystallized several times from isopropyl alcohol-nhexane to yield 7.4 g. of 3-[4-(2-dimethylaminoethoxy)-phenyl]-2-phenylphthalimidine, m.p. 150–151° C.

7. 2-Phenyl-3-]4-(2-pyrrolidinoethoxy)phenyl]-phthalimidine, m.p. 142–143° C., 10.0 g., was prepared as in Example B-6 using 30.1 g. of 3-(4-hydroxyphenyl)-2-phenyl-phthalimidine, 15.0 g. of 2-pyrrolidinoethyl chloride, 100 g. of anhydrous potassium carbonate, 250 ml. of dimethylformamide, a heating period of 21 hours at 100–105° C. and successive recrystallizations from isopropyl alcohol-n-hexane, isopropyl alcohol-ether, chloroform-n-hexane and benzene-n-hexane.

8. 3[4-(2-Diethylaminoethoxy)phenyl]-2-(4-methoxyphenyl)phthalimidine—To a stirred mixture flushed with nitrogen and containing 20 g. of 3-(2-hydroxyphenyl)-2-(4-methoxyphenyl) 375 ml. of benzene and 80 ml. of dimethylformamide was added carefully in small portions 4.0 g. of a 51.7 percent dispersion of sodium hydride (about 2.1 g. of NaH) in mineral oil. Stirring was continued until gas evolution ceased and then 9.7 g. of 2-diethylaminoethyl chloride in 25 ml. of benzene was added to the stirred mixture and the resulting reaction mixture was heated at reflux with stirring for 17 hours. The reaction mixture was then cooled and the excess sodium hydride was decomposed by adding water. The precipitated inorganic salts were filtered off and washed with benzene. The combined filtrate and washing were evaporated by heating *in vacuo* on a steam bath. The residual oily material was dissolved in either (about 50 ml.) n-hexane was added to turbidity and the mixture chilled in an acetone bath containing solid carbon dioxide. The separated solid material was collected and dissolved in ether. The ether extract was washed successively with 3N aqueous sodium hydroxide solution and water, and then extracted with 3N hydrochloride acid. The acidic extract was washed with water, cooled, made basic with 3N sodium hydride solution and extracted with ether. The ether extract was dried over anhydrous magnesium sulfate and the ether removed *in vacuo to yield a yellow viscous oil. The oil was dissolved in* 100 ml. of ether, the solution made turbid by adding n-hexane and the mixture cooled whereupon the crystalline precipitate resulted. The precipitate was collected and recrystallized from -ethyl-n-hexane to yield 10.8 g. of 3-[4-(2-diethylaminoethoxy)phenyl]-2-(4-methoxyphenyl)phthalimidine, m.p. 86–87.5°C.

9. 2-Cycloheptyl-3-(4-methoxyphenyl)phthalimidine—To a stirred mixture containing 16.1 g. of 2-cycloheptyl-3-(4-methoxyphenyl)phthalimidine, 50 g. of anhydrous potassium carbonate and 200 ml. of dimethylformamide was added portionwise 4.2 g. of methyl iodide. The reaction mixture was stirred for 30 minutes at room temperature, warmed on a steam bath and an additional 8.4 g. of methyl iodide was added portionwise over a 2 hour period. The reaction mixture was then stirred on a steam bath for an additional 16 hours, and filtered while hot. The filtrate was evaporated *in vacuo* and the residue was slurried with 200 ml. of boiling chloroform and the mixture filtered. The filtrate was washed with water, dried over anhydrous potassium carbonate and the chloroform distilled off *in vacuo*. The remaining oil was triturated with n-hexane to yield a solid product. The solid was recrystallized from n-hexane to yield 8.7 g. of 2-cycloheptyl-3-(4-methoxyphenyl)phthalimidine, m.p. 101°C.

10. 2-Cyclohexyl-3-[4-(2diethylaminoethoxy)-phenyl]phthalimidine, m.p. 66–67°C., 9.4 g., was prepared as Example B–8 using 20 g. of 2-cyclohexyl-3-(4-hydroxyphenyl)phthalimidine, 400 ml. of benzene, 200 ml. of dimethylformamide, 4.6 g. of a 51.7 percent dispersion of sodium hydride in mineral oil, 10.5 g. of 2-diethylaminoethyl chloride, a refluxing period of 17 hours and recrystallization from *n*-hexane.

2-Cyclohexyl-3-[4-(2-diethylaminoethoxy)phenyl]-phthalimidine is the species of claim 16.

11. 2-Cyclohexyl-3-[4-(2-pyrrolidinoethoxy)phenyl] phthalimide—a stirred mixture under nitrogen and containing 20 g. of 2-cyclohexyl-3-(4-hydroxyphenyl)phthalimidine and 100 ml. of dimethyl sulfoxide was added 7.3 g. of anhydrous potassium tert.-butoxide and the resulting solution was stirred at 30°C. for 90 minutes. To the resulting solution was added 8.7 g. of 2-pyrrolidinoethyl chloride and the reaction mixture was stirred for 5 hours. The reaction mixture was then treated with water and ether, and the layers separated. The ether layer was washed with water several times to remove the dimethyl sulfoxide and was then extracted with 2N hydrochloric acid. The acetic extract was then made alkaline with 3N sodium hydroxide solution and the separated oil was extracted with ether. The ether extract was dried over anhydrous magnesium sulfate and the ether distilled off *in vacuo*. The residue was taken up in ether, made turbid with *n*-hexane and cooled. The precipitated solid was collected, dried, and recrystallized three times from 5 percent isoporpyl alcohol and 95 percent *n*-hexane, the first time using decolorizing charcoal, to yield 6.5 g. of 2-cyclohexyl-3-[4-(-pyrrolidinoethoxy)phenyl]2phthalimidine, m.p. 145–147°C.

12. 2-Cyclohexyl-3-[4-(2-piperidinoethoxy)phenyl]-phthalimidine—A 20 g. portion of 2-cyclohexyl-3-(4-hydroxyphenyl)phthalimidine was mixed with 250 ml. of diethylene glycol dimethyl ether and the mixture heated to 162°C. with stirring under an atmosphere of nitrogen. The mixture was cooled to about 100°C., 50 ml. of dimethylformamide was added to effect complete solubility of the phthalimidine. To the stirred solution was then carefully added dropwise a solution containing 3.5 g. of sodium methoxide in 20 ml. of methanol. The mixture was heated slowly, allowing the methanol to distill slowly from the reaction mixture. After 3 hours (reaction temperature at 130°C.), a solid material began to form whereupon the heating was stopped and the reaction mixture allowed to cool. To the stirred mass was added 9.7 g. of 2-piperidinoethyl chloride. The stirred reaction mixture was warmed gradually to 100°C. and then heated at that temperature for 17 hours and cooled. The inorganic salts were filtered off and the filtrate was evaporated *in vacuo* on a steam bath to yield a viscous oil which was dissolved by heating it with 250 ml. of *n*-hexane. On cooling the *n*-hexane solution, a white crystalline precipitate plus a small amount of yellow oil separated. The solid and oil were dissolved in 500 ml. of ether and the ether solution extracted with 2N hydrochloric acid. The acidic extract was made alkaline with 3N sodium hydroxide solution and the mixture extracted with ether. The ether extract was washed with water, dried over anhydrous magnesium sulfate and the ether removed by distilling *in vacuo*. The remaining viscous oil was dissolved in 250 ml. of *n*-hexane by warming the mixture on a steam bath. The solution was cooled in an ice bath and the separated crystalline product was collected, recrystallized three times from *n*-hexane and dried *in vacuo* to yield 10.9 g. of 2-cyclohexyl-3-[4-(2-piperidonoethoxy)phenyl]phthalimidine, m.p. 90–91°AC.

13. 2-Cyclooctyl-3-[4-(2-pyrrolidinoethoxy)phenyl]-phthalimidine as its hydrochloride, m.p. 234°C., 8.7 g., was prepared as in Example B–12 using 20.1 g. of 2-cycloheptyl-3-(4-hydroxyphenyl)phthalimidine, 270 ml. of diethylene glycol dimethyl ether, 3.23 g. of sodium methoxide in 30 ml. of methanol, 8.0 g. of 2-pyrrolidinoethyl chloride, a refluxing period of 22 hours and recrystallization from isopropyl acetate containing a few drops of chloroform.

14. 2-Cylcooctyl-3[4-(2-piperidinoethoxy)phenyl]-phthalimidine, m.p. 101°C., 13.2 g., was prepared as in Example B–12 using 20.1 g. of 2-cyclohexyl-3-(4-hydroxyphenyl)-phthalimidine, 600 ml. of diethylene glycol dimethyl ether, 3.23 g. of sodium methoxide in 50 ml. of methanol, 8.9 g. of 2piperidinoethyl chloride, a refluxing period of 42 hours and recrystallization from *n*-hexane.

15. 2-*n*-Butyl-3-(4-methoxyphenyl)phthalimidine—A mixture containing 8.2 g. of 2-*n*-butyl-3-(4-hydroxyphenyl)-phthalimidine, 30 g. of anhydrous potassium carbonate, 100 ml. of dimethylformamide and 10 ml. of methyl iodide was stirred on a steam bath for 1 hour; another 10 g. portion of methyl iodide was added and stirring on the steam bath was continued for another hour. The reaction mixture was then allowed to stand overnight (16 hours) at room temperature and was poured into water. The aqueous mixture was extracted with chloroform. The chloroform extract was washed with water, dried over anhydrous potassium carbonate and heated *in vacuo* to remove the chloroform. The remaining oil was distilled under reduced pressure to yield 5.0 g. of 2-n-butyl-3-(4-methoxyphenyl)phthalimidine, b.p. 185–187° C. at 0.08 torr.

16. 3-[4-(2,3-Epoxypropoxy)phenyl]-2phenylphthalimidine—To a stirred mixture under an atmosphere of nitrogen and containing 15.0 g. of 3-(4-hydroxphenyl)-2-phenylphthalimidine, 375 ml. of benzene and 75 ml. of dimethylformamide was added carefully over a period of 20 minutes 4.4 g. of a 51.7 percent suspension of sodium hydride in mineral oil. After effervescence had ceased, a solution containing 4.7 g. of epichlorohydrin in 25 ml. of benzene was added and the mixture heated to reflux. In order to facilitate stirring of the reaction mixture, which contained a heavy precipitate, 50 ml. of dimethylformamide was added and refluxing with stirring was continued for 17 hours. The reaction mixture was cooled in ice ans water was carefully added dropwise to decompose any excess sodium hydride. Next 250 ml. of water was added, the layers separated and the aqueous layer extracted with benzene. The benzene layer and washings were combined, washed successively with water and brine, dried over anhydrous magnesium sulfate and evaporated *in vacuo* to yield 15 g. of a yellow gummy material. The gummy material was purified chromatographically using silica gel as the adsorbent, 1:1 (v:v) of benzene-ethyl acetate as the initial eluant and subsequent eluants of 100 percent n-hexane and varying ratios of acetone and n-hexane. Evaporation of the eluant obtained by using 1:3 (v:v) of acetone and n-hexane yielded 2.7 g. of a solid which was recrystallized twice from acetone-n-hexane to yield 2.3 g. of 3-[4-(2,3-epoxypropoxy)phenyl]-2-phenylphthalimidine, m.p. 115°–116° C.

17. Ethyl 4-(2-phenyl-3-phthalimidinyl)phenoxyacetate - To a stirred warm solution under an atmosphere of nitrogen and containing 15.0 g. of 3-(4-hydroxyphenyl)-2-phenylphthalimidine, 375 ml. of benzene and 80 ml. of dimethylformamide was added carefully 2.7 g. of a 51.7 percent dispersion of sodium hydride in mineral oil. After gas evolution ceased, a solution containing 8.35 g. of ethyl bromoacetate in 25 ml. of benzene was added and the stirred reaction mixture was heated to reflux for 17 hours. The reaction mixture was cooled in an ice bath, the excess sodium hydroxide decomposed with ethanol and water, 200 ml. of water added and the mixture shaken well. The layers were separated and the aqueous layer extracted with benzene. The combined benzene layer and extract were washed with water, dried over anhydrous magnesium sulfate and evaporated *in vacuo* to yield a yellow viscous oil which solidified on standing. The solid was recrystallized from acetone-*n*-hexane (150 ml. - 350 ml.) and dried *in vacuo* to yield 15.2 g. of ethyl 4-(2-phenyl-3-phthalimidinyl)phenoxyacetate, m.p. 154°–155° C.

Following the procedure described in the above examples, e.g., B–1, B–2, B–6, B–12, using the appropriate 3-(4-hydroxphenyl)-2-Z-phthalimidine and the appropriate ester of the formula R-An, the following compounds are prepared:

18. 3-[4-(3-Piperidinopropoxy)phenyl]-2-(3-trifluorophenyl)phthalimidine using 3-(4-hydroxyphenyl)-2-(3-trifluorophenyl)phthalimidine and 3-piperidinopropyl bromide.

19. 2-(4-Ethoxyphenyl)-3-[4-(4-dimethylaminobutoxy)phenyl]phthalimidine using 2-(4-ethoxyphenyl)-3-(4-hydroxyphenyl)phthalimidine and 4-dimethylaminobutyl chloride.

20. 2-(4-Benzyloxyphenyl)-3-[4-(2-morpholinoethoxy)phenyl]phthalimidine using 2-(4-benzyloxyphenyl)-3-(4-hydroxyphenyl)phthalimidine and 2-morpholinoethyl chloride.

21. 2-(4-Ethylphenyl)-3-[4-(6-diethylaminohexoxy)phenyl]phthalimidine using 2-(4-ethylphenyl)-3-(4-hydroxyphenyl)phthalimidine and 6-diethylaminohexyl chloride.

22. 2-(4-n-Butoxyphenyl)-3-{4-[2-(2-methylpiperidino)-ethoxy]methylpiperidino)-ethoxy]phenyl}phthalimidine using 2-(4-n-butoxyphenyl)-3-(4-hydroxyphenyl)phthalimidine and 2-(2-methylpiperidono)-ethyl iodide.

23. 2-(4-Bromophenyl)-3-{4-[2-(2,6-dimethylpiperidino)ethoxy[phenyl } phthalimidine using 2-(4-bromophenyl)-3-(4-hydroxyphenyl)phthalimidine and 2-(2,6-dimethylpiperidino)ethyl chloride.

24. 3-{4-[3-(2,5-Dimethylpyrrolidino)propoxy]-phenyl}phthalimidine-2-(4-iodophenyl)phthalimidine using 3-(4-hydroxphenyl)-2-(4-iodophenyl)phthalimidine using 3-4-hydroxphenyl)-2-(4-iodophenyl)phthalimidine and 3-(2,5dimethylpyrrolidino)propyl bromide.

25. 2-(2-Fluorophenyl)-3-{4-[2-(4-methylpiperazino)ethoxy]phenyl}phthalimidine using 2-(2-fluorophenyl)-3-(4-hydroxyphenyl)phthalimidine and 2-(4-methylpiperazino)ethyl chloride.

26. 3-[4-(2-n-Butylaminoethoxy)phenyl]-2-(3,4-dichlorophenyl)phthalimidine using 2-(3,4-dichlorophenyl)-3-(4-hydroxyphenyl)phthalimidine and 2-di-n-butylaminoethyl bromide.

27. 3-[4-(2-Di-n-hexylaminoethoxy)phenyl]-2-(3,4,5-trimethoxyphenyl)phthalimidine using 3-(4hydroxyphenyl)-2-(3,4,5-trimethoxyphenyl)phthalimidine and 2-di-n-hexylaminoethyl chloride.

28. 2-(3-Benzyloxyphenyl)-3- 4-[2-(ethylmethylamino)ethoxy]phenyl}phthalimidine using 2-(3-benzyloxyphenyl)-3-(4-hydroxyphenyl)phthalimidine and 2-(ethylmethylamino)ethyl chloride.

29. 2-(2-Cyclopropyl)-3-[4-(3-dimethylamino-2-propoxy)phenyl]phthalimidine using 2-cyclopropyl-3-(4-hydroxyphenyl)phthalimidine and 3-dimethylamino-2-propyl chloride.

30. 2-Cyclobutyl-3-[4-(3-diethylaminopropoxy)phenyl} phthalimidine using 2-cyclobutyl-3-(4-hydroxyphenyl)phthalimidine and 3-diethylaminopropyl iodide.

31. 2-Cyclopentyl-3-[4-(5-diethylamino-2-pentoxy)phenyl]phthalimidine using 2-cyclopentyl-3-(4-hydroxyphenyl)phthalimidine and 5-diethylamino-2-pentyl chloride.

32. 3-[4-(2-Diethylaminoethoxy)phenyl]-2-n-hexylphthalimidine using 2-n-hexyl-3-(4-hydoxphenyl)phthalimidine and 2-diethylaminoethyl chloride.

33. 2-Isobutyl-3-[4-(2-pyrrolidinoethoxy)phenyl]-phthalimidine using 3-(4-hydroxphenyl)-2-isobutylphthalimidine and 2-pyrrolidinoethyl chloride.

34. 2-n-Decyl-3-[4-(2-diethylaminoethoxy)phenyl] phthalimidine using 2-n-decyl-3-(4-hydroxyphenyl)phthalimidine and 2-diethylaminoethyl chloride.

35. 3-[4-(2-Diethylaminoethoxy)phenyl]2-(3-trichloromethylphenyl)phthalimidine using 3-(4-hydroxophenyl)-2-(3-trichlorometyhlphenyl)phthalmidine and 2-diethylaminoethyl chloride.

36. 3-[4-(2,3-Epoxypropoxy)phenyl]-2-(methoxyphenyl)phthalimidine using 3-(4-hydroxphenyl)phthalimidine and epichlorohydrin.

37. Methyl 4-(2-cyclohexyl-3-phthalimidinyl)phenoxyacetate using 2-cyclohexyl-3-(4-hydroxyphenyl)phthalimidine and methyl bromoacetate.

38. n-Butyl 3-{4-[2-(4-methylphenyl)-3-phthalimidinyl]phenoxy}propanoate using 3-(4-hydroxyphenyl)-2-(4-methylphenyl)phthalimidine and n-butyl 3-chloropropanoate.

39. Ethyl 5-[4-(2-n-hexyl-3-phthalimidinyl)phenoxy]pentanoate using 2-n-hexyl-3-(4-hydroxyphenyl)phthalimidine and ethyl 5-bromopentanoate.

40. n-Hexyl 4-[2-(4-ethoxyphenyl)-3-phthalimidinyl] phenoxyacetate using 2-(4-ethoxyphenyl)-3-(4-hydroxyphenyl)phthalimidine and n-hexyl bromoacetate.

41. 2-Cyclohexyl-3[4-(2,3-epoxypropoxy)phenyl]pht halimidine using 2-cyclohexyl-3-(4-hydroxyphenyl)phthalimidine and epichlorohydrin.

42. 3-[4-(2,3-Epoxypropoxy)phenyl]-2n-hexyl-phthalimidine using 2-n-hexyl-3-(4-hydroxyphenyl)phthalimidine and epichlorohydrin.

43. 2-Cyclohexyl-3-[4-(2-diethylaminoethoxy)-3-methoxyphenyl]phthalimidine using 2-cyclohexyl-3(4-hydroxy-3-methoxyphenyl)phthalimidine and 2-diethylaminoethyl chloride.

44. 2-(4-Chlorophenyl)-3-[4-(2-diethylaminoethoxy)phenyl]phthalimidine using 2-(4-chlorophenyl)-3-(4-hydroxyphenyl)phthalimidine and 2-diethylaminoethyl chloride.

45. 2-(4-Hydroxyphenyl)3-[4-(2-morpholinoethoxy)phenyl]phthalimidine is prepared by catalytically hydrogenating 2-(4-benzyloxyphenyl)-3-[4-(2-morpholinoethoxy)phenyl]phthalimidine in the presence of platinum oxide.

46. 3- 4-[2-(ethylmethylamino)ethoxy]phenyl -2-(3-hydroxyphenyl)phthalimidine is prepared by catalytically hydrogenating 2-(3-benzyloxyphenyl)-3- 4-[2-(ethylmethylamino)ethoxy]phenyl phthalimidine using platinum oxide.

The antifertility activity of the compounds of the invention was determined by the following standard test procedure using female rats which are medicated prior to, during and after the mating period. The rats are autopsied on the 14th post-mating day and the uteri are examined for evidence of pregnancy. The procedural details are as follows: A colony of sexually mature female rats of the Sprague-Dawley strain weighing 200–300 gms. are maintained on routine laboratory care. Daily vaginal smears are examined to record the cyclic characteristics of each rat. A given test is composed of rats which have exhibited a minimum of three coincidental estrus cycles. Three days prior to an expected estrus the rats to be placed on test are grouped, housed individually and placed on medication. The medication consists of a test compound, prepared as a solution or suspension in suitable vehicle, administered subcutaneously or orally via stomach tube once daily for a total of eight medications in a 10 day period (Sunday medications are omitted). One group receives only the vehicle in a like manner to serve as a control. Late in the afternoon of the day preceding the expected estrus, a mature proven fertile male is housed with each female overnight. The following morning all males are removed and a vaginal smear of each female is examined for the presence of spermatozoa as evidence that insemination has occurred. Medication of all inseminated rats is continued through the seventh post insemination day. The rats are autopsied 7 days after the last medication and the uteri removed and examined for evidence of pregnancy. The number of implantation sites, number of resorption sites, total number of fetuses and the number of viable fetuses are recorded. When tested by this procedure, the compounds of the invention were found to have antifertility at dose levels ranging from about 50 to 200 mg. per kg. per day.

The hypocholesteremic activity of the compounds of the invention was assessed by blood serum cholesterol analysis [Turner et al., Scand J. Clin. Lab. Investigation 9, 210 (1949)]of male rats receiving the test compound by oral administration as compared with a group of control rats receiving no medication. When tested by this procedure, the compounds were found to reduce serum cholesterol at dose levels of about 50 to 300 mg. per kg. per day.

The actual determination of the numerical antifertility or hypocholesteremic data definitive for a particular compound is readily obtained by standard test procedures, referred to above, by technicians versed in endrocrinological test procedures, without any need for any extensive experimentation.

The compounds of the invention can be prepared for use by conventional pharmaceutical procedures: that is, by dissolving or suspending them in a pharmaceutically acceptable vehicle, e.g., aqueous alcohol, glycol, oil solution, or oil-water emulsion, for parenteral or oral administration; or by incorporating them in unit dosage form as tablets or capsules for oral administration either alone or in combination with conventional adjuvants, e.g., calcium carbonate, starch, lactose, talc, magnesium stearate, gum acacia, and the like.

I claim:

1. 3-(4-R-O-phenyl)-2-Z-phthalimidine where R is loweralkyl lower-carbalkoxy-(lower-alkyl), 2,3epoxypropyl or BN-Y, BN is di-(lower-alkyl)amino wherein each lower-alkyl has from one to six carbon atoms or a member selected from piperidino, morpholino, pyrrolidino, piperazino, hexamethyleneimino and lower-alkylated derivatives thereof, Y is alkylene having from two to six carbon atoms and having its connecting linkages on different carbon atoms, and Z is alkyl having from four to 10 carbon atoms, inclusive, phenyl and Q-phenyl, where Q is from one to three substituents selected from halo, lower-alkyl lower-alkoxy, trifluoromethyl, trichloromethyl, hydroxy or benzyloxy.

2. 3-[4-(BN-Y-O)-phenyl]-2-phenylphthalimidine according to claim 1 where R is BN-Y and Z is phenyl.

3. 3-[4-(BN-Y-O)-phenyl]-2-Z-phthalimidine according to claim 1 where R is BN-Y and Z is cycloalkyl having from three to eight ring-carbon atoms inclusive.

4. A compound according to claim 2 where BN-Y is 2-di-(lower-alkyl)-aminoethyl.

5. A compound according to claim 1 where R is 2-di-(lower-alkyl)-aminoethyl and Z is 4-methoxyphenyl.

6. A compound according to claim 3 where BN-Y is 2-di-(lower-alkyl)-aminoethyl and Z is cyclohexyl.

7. A compound according to claim 2 where BN is pyrrolidino.

8. A compound according to claim 3 where BN-Y is 2-pyrrolidinoethyl and Z is cycloalkyl having from six to eight ring-carbon atoms inclusive.

9. A compound according to claim 3 where BN-Y is 2-piperidinoethyl and Z is cycloalkyl having from six to eight ring-carbon atoms inclusive.

10. A compound according to claim 4 where BN-Y is 2-diethylaminoethyl.

11. A compound according to claim 4 where BN-Y is 2-dimethylaminoethyl.

12. A compound according to claim 7 where BN-Y is 2-pyrrolidinoethyl.

13. A compound according to claim 1 where R is 2-diethylaminoethyl and Z is 4-methoxyphenyl.

14. A compound according to claim 6 where BN-Y is 2 - diethylaminoethyl.

15. A compound according to claim 8 where Z is cyclohexyl.

16. A compound according to claim 9 where Z is cyclohexyl.

17. A compound according to claim 8 where Z is cyclooctyl.

18. A compound according to claim 9 where Z is cyclooctyl.

UNITED STATES PATENT OFFICE
CERTIFICATE OF CORRECTION

Patent No. 3,607,876          Dated  September 21, 1971

Inventor(s)  Denis M. Bailey

It is certified that error appears in the above-identified patent and that said Letters Patent are hereby corrected as shown below:

Column 2, line 21, "-CH$_2$CHCH$_3$" should read -- -CH$_2$ĊHCH$_3$ --; line 22, "-CH$_2$CHCH$_2$CH$_3$" should read -- -CH$_2$ĊHCH$_2$CH$_3$ --; line 23, "-CH$_2$CH$_2$CHCH$_3$, -CH$_2$CHCH$_2$CH$_2$CH$_3$" should read -- -CH$_2$CH$_2$ĊHCH$_3$, -CH$_2$ĊHCH$_2$CH$_2$CH$_3$ --.  Column 5, line 43 "using -hydroxyphenyl)-phthalimidine 4-ethylaniline" should read -- using 4-ethylaniline --.  Column 6, line 10, "2-(4-methoxypheny)" should read -- 2-(4-methoxyphenyl) --; line 76, "(4-methoxyphenyl)" should read -- (4-methoxyphenyl)phthalimidine --.  Column 7, line 61, "phthalimidine - a stirred" should read -- phthalimidine - To a stirred --.  Column 8, lines 7 and 8, "2-cyclohexyl-3-[4-(-pyrrolidinoethoxy)phenyl]2phthalimidine" should read -- 2-cyclohexyl-3-[4-(2-pyrrolidinoethoxy)phenyl]phthalimidine --; line 44, "2-piperidono" should read -- 2-piperidino --.  Column 10, line 2, "ethoxy]methylpiperidino)-ethoxy]phenyl" should read -- ethoxy]phenyl --; lines 11-13, delete line 12 (line repeated); line 54, "4-hydroxophenyl" should read -- 4-hydroxyphenyl--; line 57, "...phenyl)phthalimidine" should read --. . .phenyl)-2-(4-methoxyphenyl)-phthalimidine --.  Column 12, line 23, between "atoms," and "inclusive", insert -- cycloalkyl having from three to eight ring-carbon atoms --.

Signed and sealed this 6th day of June 1972.

(SEAL)
Attest:

EDWARD M. FLETCHER, JR.
Attesting Officer

ROBERT GOTTSCHALK
Commissioner of Patents